(12) United States Patent
Nakawatase et al.

(10) Patent No.: US 8,495,747 B1
(45) Date of Patent: Jul. 23, 2013

(54) PRIORITIZING ASSET REMEDIATIONS

(75) Inventors: Ryan Nakawatase, San Diego, CA (US); Sven Schrecker, San Marcos, CA (US); Stephen Ritter, Wilsonville, OR (US)

(73) Assignee: McAfee, Inc., Santa Clara, CA (US)

( * ) Notice: Subject to any disclaimer, the term of this patent is extended or adjusted under 35 U.S.C. 154(b) by 306 days.

(21) Appl. No.: 12/751,995

(22) Filed: Mar. 31, 2010

(51) Int. Cl.
*H04L 29/06* (2006.01)

(52) U.S. Cl.
USPC .......................................................... 726/25

(58) Field of Classification Search
USPC ............... 726/3, 11–14, 22–25; 709/223–226
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,134,664 A | 10/2000 | Walker | |
| 6,460,050 B1 | 10/2002 | Pace et al. | |
| 6,631,473 B2 | 10/2003 | Townsend | |
| 6,839,850 B1 * | 1/2005 | Campbell et al. | 726/23 |
| 7,010,696 B1 * | 3/2006 | Cambridge et al. | 713/188 |
| 7,096,502 B1 | 8/2006 | Fox et al. | |
| 7,260,844 B1 | 8/2007 | Tidwell et al. | |
| 7,278,163 B2 * | 10/2007 | Banzhof et al. | 726/25 |
| 7,506,155 B1 | 3/2009 | Stewart et al. | |
| 7,530,104 B1 | 5/2009 | Thrower et al. | |
| 7,536,724 B1 * | 5/2009 | Sobel et al. | 726/25 |
| 7,653,942 B2 | 1/2010 | Tamura et al. | |
| 7,748,041 B2 * | 6/2010 | Anzai et al. | 726/25 |
| 7,818,802 B2 | 10/2010 | Szor et al. | |
| 7,890,869 B1 | 2/2011 | Mayer et al. | |
| 7,904,960 B2 | 3/2011 | Ithal | |
| 7,913,303 B1 | 3/2011 | Rouland et al. | |
| 8,095,984 B2 | 1/2012 | McFarlane et al. | |
| 8,132,260 B1 * | 3/2012 | Mayer et al. | 726/25 |
| 8,166,551 B2 | 4/2012 | King | |
| 8,201,257 B1 | 6/2012 | Andres et al. | |
| 2004/0049698 A1 | 3/2004 | Ott et al. | |
| 2004/0103309 A1 | 5/2004 | Tracy et al. | |
| 2004/0193892 A1 | 9/2004 | Tamura et al. | |
| 2006/0015941 A1 | 1/2006 | McKenna | |
| 2006/0101517 A1 | 5/2006 | Banzhof et al. | |
| 2006/0136327 A1 | 6/2006 | You | |
| 2006/0265324 A1 | 11/2006 | Leclerc et al. | |

(Continued)

OTHER PUBLICATIONS

"Preventsys Introduces Latest Version of Enterprise Security Management" SecurityProNews [online]. [Retrieved on May 18, 2012]. Retrieved from Internet Electronic mail: http://www.securitypronews.com/news/securitynews/spn-45-20040927PreventsysintroducesLatestVersionofEnterpriseSecurityManagement.html. 2 pages, copyright 2012 FENTRY Network. Sep. 27, 2004.

(Continued)

*Primary Examiner* — Gilberto Barron, Jr.
*Assistant Examiner* — Abdulhakim Nobahar
(74) *Attorney, Agent, or Firm* — Patent Capital Group

(57) ABSTRACT

Methods, systems, and apparatus, including computer programs encoded on computer storage media, for prioritizing asset remediations. One method includes generating a risk metric for an asset and a threat, generating a remediation availability metric for the asset and the threat, and determining a remediation prioritization metric for the asset and the threat according to the risk metric and the remediation availability metric. The remediation prioritization metric specifies a priority of applying the remediation to the asset.

23 Claims, 8 Drawing Sheets

U.S. PATENT DOCUMENTS

| | | | |
|---|---|---|---|
| 2006/0265751 A1 | 11/2006 | Cosquer et al. |
| 2007/0016955 A1 | 1/2007 | Goldberg et al. |
| 2007/0061571 A1 | 3/2007 | Hammes et al. |
| 2007/0192344 A1 | 8/2007 | Meier et al. |
| 2007/0250932 A1 | 10/2007 | Kothari |
| 2009/0024627 A1 | 1/2009 | King |
| 2009/0099885 A1 | 4/2009 | Sung et al. |
| 2009/0106843 A1 | 4/2009 | Kang et al. |
| 2009/0328206 A1 | 12/2009 | Bardsley et al. |
| 2010/0125912 A1 | 5/2010 | Greenshpon et al. |
| 2010/0241974 A1 | 9/2010 | Rubin et al. |
| 2010/0325412 A1 | 12/2010 | Norrman et al. |
| 2010/0333002 A1 | 12/2010 | Karabey et al. |
| 2011/0119765 A1 | 5/2011 | Hering et al. |

OTHER PUBLICATIONS

"Skybox Risk Control" Skybox Security [online]. [Retrieved on May 18, 2012]. Retrieved from Internet electronic mail: http://www.skyboxsecurity.com/securityrisk, 2 pages. Copyright 2002-2010, Skybox Security, Inc.

"Skybox Network Assurance" Skybox Security [online]. [Retrieved on May 18, 2012]. Retrieved from Internet electronic mail: http://www.skyboxsecurity.com/networkcompliance. 2 pages. Copyright 2002-2010 Skybox Security, Inc.

"Skybox Firewall Assurance" Skybox Security [online]. [Retrieved on May 18, 2012]. Retrieved from Internet electronic mail: http://www.skyboxsecurity.com/firewallcompliance. 2 pages. Copyright 2002-2010 Skybox Security, Inc.

"Skybox Threat Manager" Skybox Security [online]. Retrieved from Internet electronic mail: http://www.skyboxsecurity.com/products/threat-manager%20. 2 pages. Copyright 2002-2010, Skybox Security, Inc.

"Intrusion prevention system" [online]. [Retrieved on May 18, 2012]. Retrieved from Internet electronic mail: http://en.wikipedia.org/wiki/Intrustion_prevention_system, 3 pages. Last modified on May 2, 2012.

"Intrusion detection system" [online]. [Retrieved on May 18, 2012]. Retrieved from Internet electronic mail: http://en.widipedia.org/wiki/Intrustion_detection_system, 6 pages. Last modified on Apr. 16, 2012.

Foundstone's Threat Correlation Module Prioritizes Critical Threats Facing Every Enterprise System [online]. [Retrieved on May 18, 2012]. Retrieved from Internet electronic mail: http://findarticles.com/particles/mi_m0EIN/is_2003_Sept_15/ai_107753228/, 4 pages, Sep. 15, 2003.

"McAfee Vulnerability Manager" [online]. [Retrieved on May 18, 2012]. Retrieved from Internet electronic mail: http://www.it-cube.net/loesungen/it-security/vulnerability-risk-mgmt/foundstone/downloads/?no_cache=1&tx_abdownloads_pi1%5Baction%5D=getviewclickeddownload&tx_abdownloads_pi1%5Buid%5D=233&tx_abdownloads_pi1%5Bcid%5D=1047, 3 pages. Copyright 2010 McAfee, Inc.

"Foundstone Remediation" [online]. [Retrieved on May 18, 2012]. Retrieved from Internet electronic mail: http://www.it-cube.net/loesungen/it-security/vulnerability-risk-mgmt/foundstone/downloads/?no_cache=1&tx_abdownloads_pi1%5Baction%5D=getviewclickedd ownload&txabdownloads_pi1%5Buid%5D=233&Tx_abdownloads_pi1%5Bcid%5D=1047, 2 pages. Copyright 2006 McAfee, Inc.

"Foundstone Threat Correlation Module" [online]. [Retrieved on May 18, 2012]. Retrieved from Internet electronic mail: http://www.it-cube.net/loesungen/it-security/vulnerability-riskmgmt/foundstone/downloads/?no_cache=1&t_abdownloads_pi1%5Baction%5D=getviewclickeddownload&Tx_abdownloads_pi1%5Buid%5D=233&tx_abdownloads_pi1%5Bcid%5D-1047, 4 pages. Copyright 2004 McAfee Inc.

"Complete Risk Management" [online]. Retrieved from Internet electronic mail: http://www.it-cube.net/loesungen/it-security/vulnerability-risk-mgmt/foundstone/downloads/?no_cache=1&tx_abdownloads_pi1%5Baction%5D=getviewclickeddownload&tx_abdownloads_pi1%5Buid%5D=233&tx_abdownloads_pi%5Bcid%5D=1047, 7 pages. Copyright 2005 McAfee, Inc.

"Release Notes for McAfee Vulnerability Manager 7.0.0" [online]. [Retrieved on May 18, 2012]. Retrieved from Internet electronic mail: http://www.it-cube.net/loesungen/it-security/vulnerability-risk-mgmt/foundstone/downloads/?no_cache=1&tx_abdownloads_pi1%5Baction%5D=getviewclickeddownload&tx_abdownloads_pi1%5Buid%5D=233&tx_abdownloads_pi1%5BCID%5D=1047, 6 pages. Copyright 2010 McAfee, Inc.

* cited by examiner

Assets to Patch Immediately: Threat XZYA14217 (Example OS Server Vulnerability)

Asset 12345 ("mailserver")

Asset 14345 ("usercomputer1")

Asset 15420 ("usercomputer2")

Asset 16549 ("webserverA")

Asset 16429 ("webserverB")

Asset 26430 ("usercomputer3")

FIG. 5B

Threats to Patch Immediately: Asset 12345

Threat XZYA14217 (Example OS Server Vulnerability 1)

Threat WRTE4569 (Example Application Vulnerability 1)

Threat PWT15409 (Example Application Vulnerability 2)

Threat KTWO1549 (Example OS Server Vulnerability 2)

PRIORITIZING ASSET REMEDIATIONS

BACKGROUND

This specification relates to prioritizing asset remediations in a system of assets. An asset is a computer or other electronic device. A system of assets can be connected over one or more networks. For example, a home might have five assets, each of which are networked to each other and connected to the outside world through the Internet. As another example, a business might have three physically separate offices, each of which has many assets. The assets within each office and the assets across the offices can be connected over a network.

Each asset in a system of assets can be at risk from multiple threats at any given time. Each threat corresponds to a potential attack on the asset by a particular virus, malware, or other unauthorized entity. An attack occurs when the unauthorized entity exploits a known vulnerability of the asset in an attempt to access or control the asset. Some threats have known remediations that, if put in place for an asset, eliminate or reduce the risk that the threat will affect the asset. Some threats do not have known remediations.

System administrators must determine what remediations to apply to assets, and the order in which to apply the remediations. However, it can be difficult, especially in large asset systems, for a system administrator to easily prioritize application of remediations.

SUMMARY

In general, one innovative aspect of the subject matter described in this specification can be embodied in methods that include the actions of generating a risk metric for an asset and a threat, wherein the risk metric is an estimate of a risk that the threat will affect the asset; generating a remediation availability metric for the asset and the threat, wherein the remediation availability metric is based, at least in part, on whether a remediation for the threat is available and not applied to the asset, wherein the remediation reduces the risk that the threat will affect the asset when applied to the asset; and determining a remediation prioritization metric for the asset and the threat according to the risk metric and the remediation availability metric, wherein the remediation prioritization metric specifies a priority of applying the remediation to the asset. Other embodiments of this aspect include corresponding systems, apparatus, and computer programs recorded on computer storage devices, each configured to perform the operations of the methods.

These and other embodiments can each optionally include one or more of the following features. The actions include presenting the remediation prioritization metric to a user. The remediation is an active countermeasure that modifies a configuration of the asset. The remediation is a software patch. Generating the risk metric for the asset and the threat comprises: receiving threat definition data for the threat and vulnerability detection data and countermeasure detection data for the asset, wherein the threat definition data identifies one or more countermeasures that reduce a risk that the threat will affect an asset, the vulnerability detection data identifies threats to which the asset is vulnerable, and the countermeasure detection data identifies one or more countermeasures protecting the asset; analyzing the vulnerability detection data to determine whether the asset is vulnerable to the threat; determining from the threat definition data and the countermeasure detection data whether the asset is protected by one of the countermeasures identified for the threat; and determining the risk metric for the asset for the threat according to whether the asset is vulnerable to the threat and whether the asset is protected by one of the countermeasures identified for the threat. Determining the risk metric further comprises determining whether the threat applies to a configuration of the asset. The risk metric for the asset and the threat is a compound risk metric further comprising a severity score estimating a severity of the threat. the remediation prioritization metric is patch immediately if the risk metric indicates that the asset is vulnerable to the threat with no countermeasure protection, the severity score satisfies a severity threshold, and the remediation availability metric indicates that a remediation is available; the remediation prioritization metric is patch urgently if the risk metric indicates that the asset is vulnerable to the threat with no countermeasure protection, the severity score does not satisfy the severity threshold, and the remediation availability metric indicates that a remediation is available; the remediation prioritization metric is patch later if the risk metric indicates that there is at least some countermeasure protection for the asset, and if the remediation availability metric indicates that a remediation is available; and otherwise, the remediation prioritization metric is do not patch.

The remediation prioritization metric for the asset and the threat is further based on a criticality of the asset. The criticality of an asset is derived from a monetary value of the asset. The criticality of an asset is derived from a business value of the asset. The actions further include determining a respective remediation prioritization metric for each of a plurality of assets and each of a plurality of threats.

Particular embodiments of the subject matter described in this specification can be implemented so as to realize one or more of the following advantages. Users can quickly determine a priority for protecting particular assets against particular threats. Users can identify which remediations should first be applied to an asset, and can also determine which assets should first be protected against a particular threat.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5B illustrates an example detailed listing of assets that have a remediation prioritization metric of patch immediately for a particular threat.

FIG. 6B illustrates an example detailed listing of threats for which a particular asset has a remediation prioritization metric of patch immediately.

DETAILED DESCRIPTION

§1.0 Asset System Overview

Figure 1:
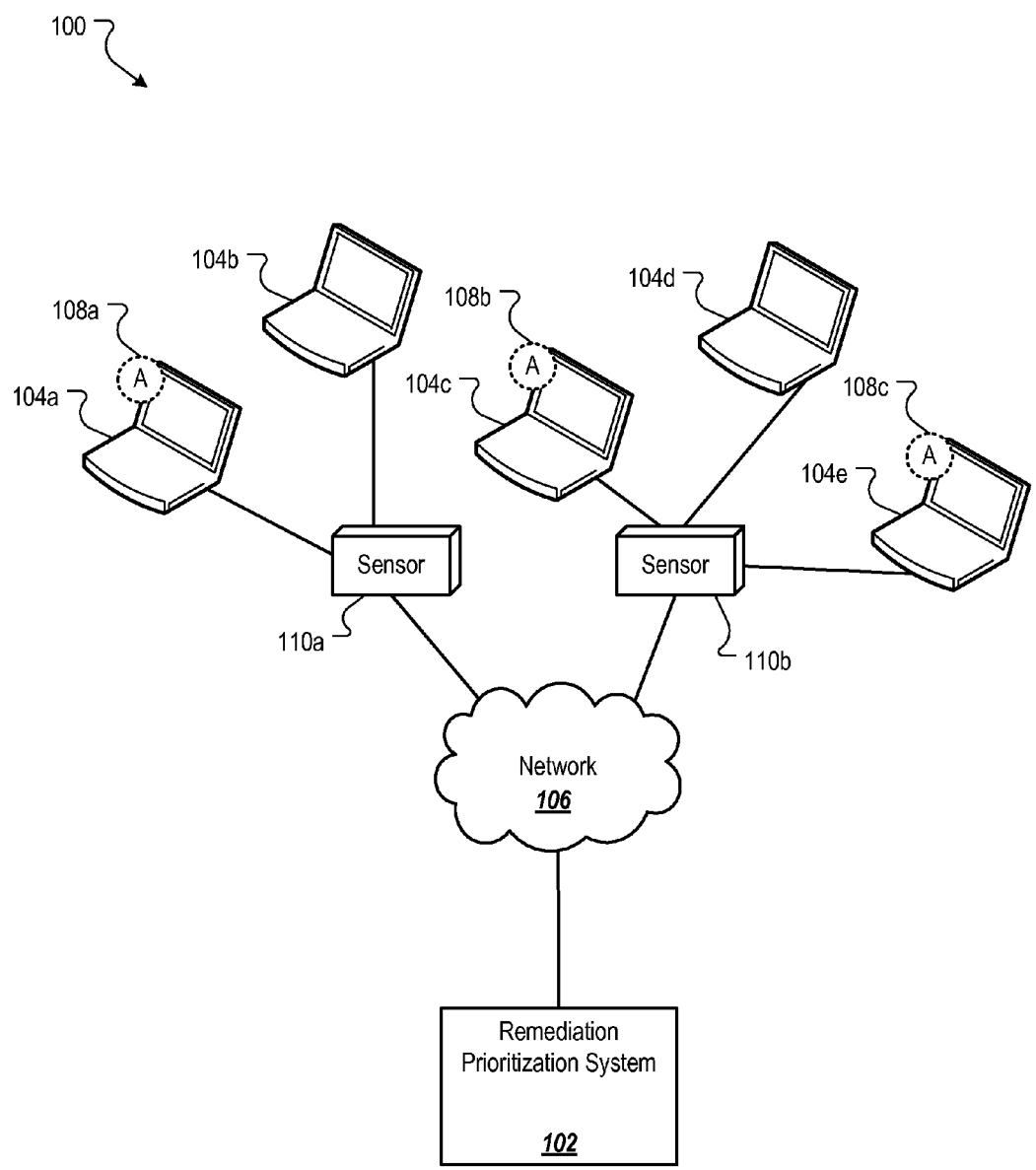
FIG. 1 illustrates an example asset system monitored by a remediation prioritization system.

FIG. 1 illustrates an example asset system 100 monitored by a remediation prioritization system 102. The assets 104 in the system 100 are connected to each other, and optionally to other systems, by a network 106.

Each asset 104 can be vulnerable to one or more threats, e.g., possible attacks. These threats include, for example, viruses, malware, and other unauthorized attacks. Each asset can be protected by a variety of countermeasures. These countermeasures include passive countermeasures and active countermeasures.

Passive countermeasures are provided by two kinds of sensors: agent-based sensors 108 and network-based sensors 110. The agent-based sensors 108 and the network based sensors 110 monitor the assets themselves and/or network traffic to and from the assets. For illustrative purposes, the sensors are described below as both monitoring the assets and protecting the assets by providing one or more countermeasures. However, the monitoring and countermeasure functionalities do not have to be provided by the same sensor. In the description below, sensor is used to refer to various types of monitoring and protection systems including, for example, firewalls, host intrusion prevention systems, network intrusion prevention systems, network access control systems, intrusion detection systems, intrusion prevention systems, anti-virus software, and spam filters.

The agent-based sensors 108 and the network-based sensors 110 can include one or more passive countermeasures that are part of the sensor. These passive countermeasures are software programs and/or hardware that protect assets from various threats. Each passive countermeasure reduces the risk that a threat will affect an asset. A passive countermeasure protects against a threat by detecting and stopping an attack associated with the threat, by detecting and stopping activities associated with the attack, or by mitigating damage caused by an attack. For example, a passive countermeasure may be configured to detect data having a signature associated with a particular attack, and block data with that signature. As another example, a passive countermeasure may generate back-up copies of particular files targeted by an attack, so that even if the attack attacks the files, the files can be restored. Example passive countermeasures include, but are not limited to, hardware firewalls, software firewalls, data loss prevention systems, web proxies, mail filters, host-based intrusion prevention systems, network-based intrusion prevention systems, rate-based intrusion prevention systems, content-based intrusion prevention systems, intrusion detection systems, and virus detection software.

Passive countermeasures can also be partial countermeasures that do not completely protect from or mitigate the effects of an attack. For example, a partial passive countermeasure might block some, but not all, of the network traffic associated with a particular attack. As another example, if a threat needs either direct physical access or network access to compromise an asset, an example partial passive countermeasure would block network access to the asset, but not physical access.

The agent-based sensors 108 are software-based sensors that are installed on respective assets 104. For example, agent-based sensor 108a is installed on asset 104a, agent-based sensor 108b is installed on asset 104c, and agent-based sensor 108c is installed on asset 104e. The agent-based sensors 108 run various analyses on their respective assets 104, for example, to identify vulnerabilities on the assets 104 or to identify viruses or other malware executing on the assets 104. The agent-based sensors may also provide one or more passive countermeasures for threats, as described above. Example agent-based sensors include antivirus software.

The network-based sensors 110 are hardware devices and/or software in a data communication path between assets 104 protected by the sensor and the network resources that the asset is attempting to access. For example, sensor 110a is connected to assets 104a and 104b, and sensor 110b is connected to assets 104c, 104d, and 104e. While FIG. 1 illustrates a single network-based sensor 110 in a communication path with each asset, other configurations are possible. For example, multiple network-based sensors 110 can be connected to the same asset 104, and some assets 104 may not be connected to any network-based sensors 110.

When an asset 104 tries to send information through the network 106 or receive information over the network 106 through a network-based sensor 110, the sensor analyzes information about the asset 104 and the information being sent or received and determines whether to allow the communication. An example network-based sensor includes one or more processors, a memory subsystem, and an input/output subsystem. The one or more processors are programmed according to instructions stored in the memory subsystem, and monitor the network traffic passing through the input/output subsystem. The one or more processors are programmed to take one or more protective actions on their own, or to query a sensor control system (not shown) and take further actions as instructed by the sensor control system 102. Example network-based sensors include network access control systems, firewalls, routers, switches, bridges, hubs, web proxies, application proxies, gateways, network access control systems, mail filters, virtual private networks, intrusion prevention systems and intrusion detection systems.

The assets 104 can also be protected by one or more active countermeasures that are applied to the asset. Active countermeasures make changes to the configuration of assets or the configuration of existing passive countermeasures to actively eliminate a vulnerability. In contrast, passive countermeasures hide the effects of a vulnerability, but do not remove the vulnerability. Each active countermeasure eliminates, or at least reduces, the risk that a threat will affect an asset when the active countermeasure is applied to the asset by eliminating, or at least reducing, a vulnerability. An active countermeasure protects against a threat by modifying the configuration of an asset 104 so that the asset is no longer vulnerable to the threat. For example, an active countermeasure can close a back door that was open on an asset or correct another type of system vulnerability. Example active countermeasures include, but are not limited to, software patches that are applied to assets.

The assets 104 may be vulnerable to many different threats at any given time. Some of the assets 104 may be already protected by one or more passive countermeasures, and some of the assets 104 may need to have additional countermeasures put in place to protect the assets from the threats. Therefore, it is helpful to prioritize the order in which remediations are applied to assets.

The remediation prioritization system 102 is one or more computers, each of which includes one or more processors, a memory subsystem, and an input/output subsystem. The remediation prioritization system 102 is programmed to process data about potential threats on the network and available remediations for those threats, as well as countermeasures provided by the sensors and vulnerabilities of the assets, in order to generate a remediation prioritization metric for assets and threats.

The remediation prioritization metric specifies a priority of applying a remediation for a threat to the asset. A remediation reduces the risk that a threat will affect an asset, when the remediation is applied to the asset. An example remediation is an active countermeasure, e.g., a patch, that is applied to an asset by being installed on the asset. Another example remediation is a modification to a sensor setting that causes a sensor to provide a passive countermeasure that better protects against the threat. A modification to a sensor setting is applied to an asset when it is applied to the sensor protecting the asset.

Remediation prioritization metrics, and example techniques for generating remediation prioritization metrics, are described in more detail below.

§2.0 Example Data Sources for Remediation Prioritization

The remediation prioritization system 102 receives data from several sources in order to determine a remediation prioritization metric for a given asset and a given threat.

Figure 2:
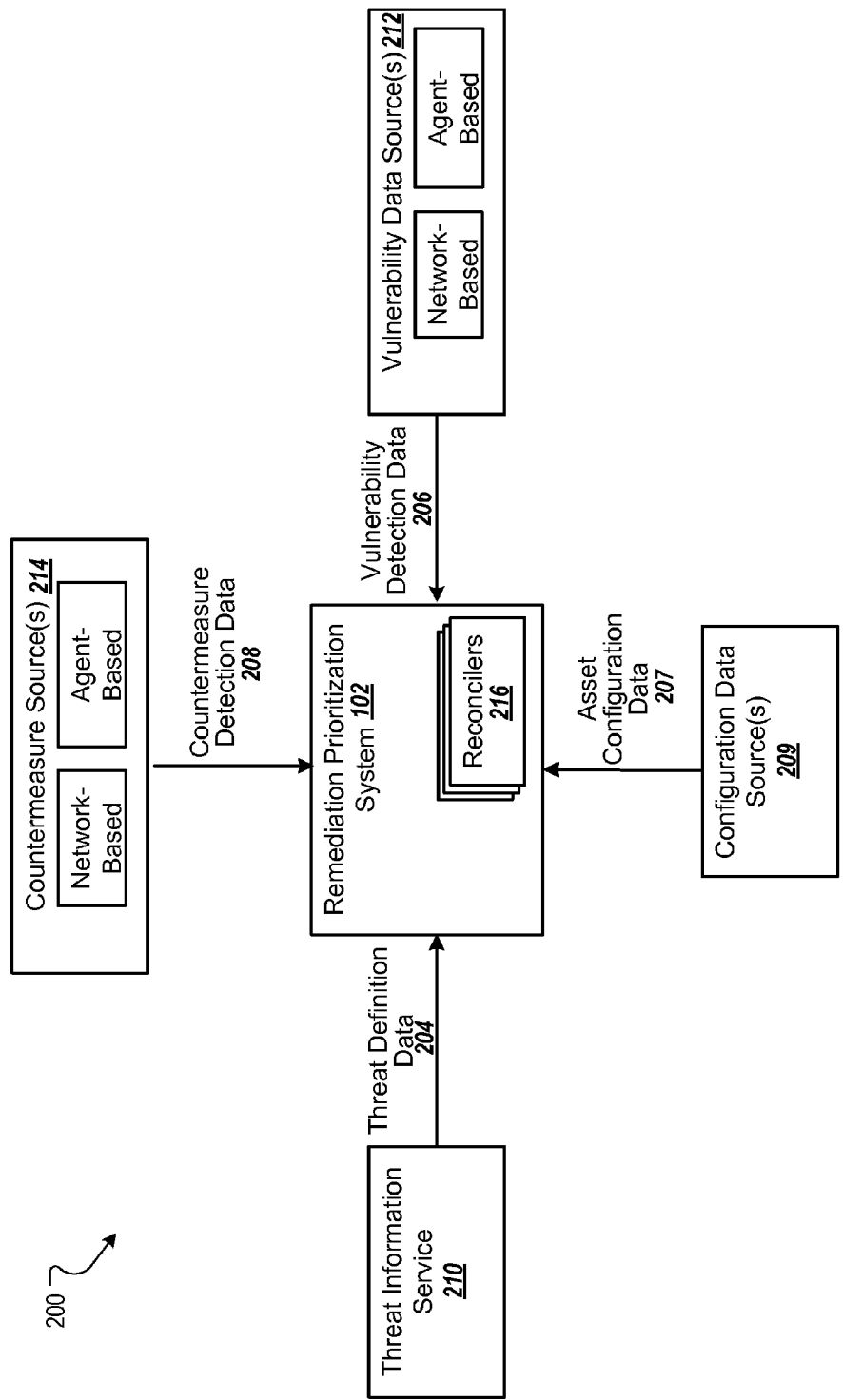
FIG. 2 illustrates an example of the sources of data used by a remediation prioritization system.

FIG. 2 illustrates an example of the sources of data used by a remediation prioritization system 102. The remediation prioritization system 102 receives one or more of threat definition data 204, vulnerability detection data 206, asset configuration data 207, and countermeasure detection data 208. The threat definition data describes identified threats, what countermeasures (if any) protect assets from the threats, and what remediations (if any) are available for a threat. The vulnerability detection data 206 specifies, for each asset and for each threat, whether the asset is vulnerable to the threat or not vulnerable to the threat. The configuration data 207 specifies, for each asset, details of the configuration of the asset. The countermeasure detection data 208 specifies, for each asset, what countermeasures are protecting the asset.

§2.1.1 Asset Configuration Data

The asset configuration data 207 is received from one or more configuration data source(s) 209. In some implementations, the configuration data source(s) 209 are one or more data aggregators. A data aggregator is one or more servers that receive configuration data, aggregate the data, and format the data in a format useable by the remediation prioritization system 102. The data aggregators can receive configuration data from the assets themselves or from the sensors monitoring the assets. Example data aggregators include Mcafee ePolicy Orchestrator®, available from McAfee of Santa Clara, Calif., and Active Directory®, available from Microsoft Corporation of Redmond, Wash. For example, a data aggregator can maintain an asset data repository with details on asset configurations. Alternatively, the configuration data source(s) 209 are the assets and/or sensors themselves. When the configuration data source(s) 209 are the assets and/or sensors themselves, the configuration data is not aggregated when it is received by the remediation prioritization system 102, and the remediation prioritization system 102 aggregates the data itself.

The configuration of an asset is a hardware and/or software configuration that determines whether a threat is applicable to an asset. In general, the configuration of the asset can include one or more of the physical configuration of the asset, the software running on the asset, and the configuration of the software running on the asset. Examples of configurations include particular families of operating systems (e.g., Windows™, Linux™, Apple OS™), specific versions of operating systems (e.g., Windows Vista™), particular network port settings (e.g., network port 8 is open), and particular software products executing on the system (e.g., a particular word processor or a particular web server). In some implementations, the configuration data does not include countermeasures in place for the asset, or whether the asset is vulnerable to a particular threat.

§2.1.2 Threat Definition Data

The threat definition data 204 is received from a threat information service 210. The threat information service 210 identifies threats and countermeasures that protect against the threats, and then provides the data to the remediation prioritization system 102. In some implementations, the threat information service 210 can provide a threat feed with the threat definition data to the remediation prioritization system 102 through a network. The threat feed can be, for example, threat definition data sent over the network either as needed, or according to a predefined schedule.

The threat definition data 204 identifies one or more threats and specifies, for each threat, the countermeasures that protect against the threat. The threat definition data 204 also specifies which sensors and/or which software products executing on the sensors can detect an attack corresponding to the threat. For example, suppose threat A can attack all machines on a network with a specific vulnerability and that product B can detect the vulnerability when it has setting C. Furthermore, product D provides passive countermeasures that mitigate the effect of the threat. In this case, the threat definition data can specify that threat A attacks all machines, that product B with setting C can detect the vulnerability to the threat, and that product D provides passive countermeasures that protect against the threat.

The data specifying the countermeasures that mitigate the effect of a threat can also include required system settings for the particular configurations of the countermeasures. For example, these settings can include a version of a signature file that must be used by a software product, or can include a product identifier, a product version identifier, and data describing other settings of the software product. The data can also identify some of the countermeasures as partial countermeasures.

The threat definition data 204 also includes data specifying one or more remediations that reduce the risk that a threat will affect an asset when the one or more remediations are applied to the asset. For example, the threat definition data for a particular threat can identify a particular patch that protects an asset from a threat. The threat definition data can also identify other details about the remediation, for example, an effectiveness measure for the remediation and where to download the remediation.

The threat definition data 204 can also optionally include other details for the threat, for example, whether the existence of the threat has been made public, who made the existence of the threat public (e.g., was it the vendor of the software that has been compromised?), a web address for a public disclosure of the threat, and one or more attack vectors for the threat. The attack vectors can be used to determine what passive countermeasures are protecting the threat at a given time.

The threat definition data 204 can also optionally include applicability data for each threat. The applicability data specifies a configuration that an asset must have in order to be vulnerable to the threat. For example, the applicability data can specify that the threat only attacks particular operating systems or particular software products installed on an asset. The applicability data can also specify that the threat only attacks particular versions of products, or products configured in a particular way.

In some implementations, the threat definition data 204 also includes a severity score for the threat and/or a countermeasure confidence score for each countermeasure that protects against the threat. The severity score is an estimate of how severe an attack by the threat would be for an asset, and may optionally also estimate how likely the threat is to affect assets. The confidence score is an estimate of how likely the countermeasure is to reduce the risk that the threat will affect the asset.

The threat definition data may also include other information about the threat, for example, a brief description of the threat, a name of the threat, an estimate of the importance of the threat, an identifier of the vendor(s) whose products are attacked by the threat, and recommendations on how to mitigate the effects of the threat.

In some implementations, the threat definition data has a hierarchical structure (e.g., multiple tiers). For example, the first tier can include a general identification of the products that are vulnerable to the threat such as the name of a software vendor or the name of a particular product vulnerable to the threat. Additional tiers can include additional details on needed configurations of the assets or other details of the threat, for example, particular product versions or settings including the applicability data described above.

§2.1.3 Vulnerability Detection Data

The vulnerability detection data 206 is received from one or more vulnerability data source(s) 212. In some implementations, the vulnerability data source(s) 212 are one or more data aggregators. The data aggregators receive vulnerability detection data from individual sensors in the system. The individual sensors can be agent-based sensors and/or network-based sensors. A data aggregator is one or more servers that receive configuration data, aggregate the data, and format it in a format useable by the remediation prioritization system 102. The data aggregators can be the same as, or different from, the data aggregators that are the configuration data source(s) 209. The data aggregators can receive vulnerability data from the assets themselves or from the sensors monitoring the assets. An example data aggregator is Mcafee ePolicy Orchestrator®, available from McAfee® of Santa Clara, Calif. Alternatively, the vulnerability data source(s) 212 can be the assets and/or sensors themselves. When the vulnerability data source(s) 212 are the assets and/or sensors themselves, the vulnerability data is not aggregated when it is received by the remediation prioritization system 102, and the remediation prioritization system 102 aggregates the data itself.

The vulnerability detection data 206 for a given asset specifies what tests were run by sensors protecting the asset, as well as the outcome of those tests. Example tests include virus scans, vulnerability analyses, system configuration checks, policy compliance checks, network traffic checks (e.g., provided by a firewall, a network intrusion detection system, or a network intrusion prevention system), and tests performed by host-based intrusion prevention systems or host-based intrusion detection systems. Conventional tests only report when an asset is vulnerable. If nothing is reported, it is unknown whether the asset is not vulnerable, or whether the asset was not tested. The vulnerability detection data 206 therefore allows the remediation prioritization system 102 to determine, in some cases, that an asset has a vulnerability that can be exploited by a threat, and to determine, in other cases, that the asset does not have the vulnerability.

Multiple sensors may test for the same threat. In that case, the vulnerability detection data 206 can include the outcome of all of the tests for the threat (optionally normalized, as described below). Alternatively, the vulnerability detection data 206 may include the outcome for only a single test, for example, a test that found the asset vulnerable or a test that found the asset not vulnerable.

§2.1.4 Countermeasure Detection Data

The countermeasure detection data 208 is received from countermeasure source(s) 214. In general, the countermeasure detection data 208 specifies, for a given asset, what passive countermeasures are in place to protect the asset. In some implementations, the countermeasure detection data 208 also specifies what passive countermeasures are not protecting the asset. A countermeasure is not protecting an asset, for example, when it is not in place at all, or when it is in place to protect the asset but is not properly configured.

The countermeasure source(s) 214 are sources that store the settings of individual sensors in the network, as well as data specifying which assets are protected by which sensors. For example, the countermeasure source(s) 214 can be one or more computers that receive data about the protection provided by sensors in the network and data about which sensors protect which assets. The countermeasure source(s) 214 aggregate the data to determine which countermeasures are in place to protect each asset. An example countermeasure data source is Mcafee ePolicy Orchestrator®, available from McAfee® of Santa Clara, Calif.

Passive countermeasures can be provided by the network-based sensors in the network, the agent-based sensors in the network or both. In general, the countermeasure detection data 206 specifies which passive countermeasures are in place and the settings for each passive countermeasure. Example settings include an identification of the product providing the passive countermeasure, a product version, and product settings. Other example settings include one or more signatures of threats (e.g., file signatures or network traffic signatures) that are blocked by the passive countermeasure.

When a passive countermeasure is provided by an agent-based sensor running on the asset, it is clear that the passive countermeasure is protecting the asset. However, network-based countermeasures are remote from the assets they are protecting. Therefore, additional data is needed to associate network-based passive countermeasures with the assets they protect. The countermeasure source(s) 214 must first determine which assets are monitored by which network-based sensors, and then associate, for each sensor, the passive countermeasures provided by the sensor with each of the assets monitored by the sensor.

There are two primary ways sensors can be associated with the assets they monitor: users can manually associate the assets with the sensors, or the assets can be automatically associated with the sensors.

In some implementations, users manually associate assets with sensors through various user interfaces. For example, one user interface allows users to manually specify the identity of each asset protected by each sensor in the network. This approach leads to maximum accuracy. However, it can be inefficient for large asset systems, e.g., an enterprise system including thousands of client computers. Alternatively, users can be presented with a user interface that allows them to specify a series of rules for associating assets with sensors. The rules can be based, for example, on Internet Protocol (IP) address ranges, nodes through which assets connect to the network, Media Access Control (MAC) address ranges, NetBIOS names of assets, or other user-specified categories, such as groups of assets defined by users or properties of assets tagged by users.

In other implementations, the countermeasure source(s) 214 can automatically correlate sensors with assets based on alerts received from the sensors. Each alert identifies an attack on an asset that was detected by the sensor. For example, when a sensor detects an attack on a particular IP address, the countermeasure source(s) 214 can determine that the sensor is protecting an asset with that particular IP address.

However, there can be problems with this approach. First, the IP address does not always uniquely identify the asset. Because the IP address is not a unique identifier, in large networks, it is possible that two different assets have the same IP address. This can occur, for example, when two routers for two different sub-networks each assign a given IP address to an asset in their networks. Also, IP addresses can change over time as assets are connected to and disconnected from the network. Therefore, an attack on an IP address at one point in time can be an attack on a first asset, and an attack on the same IP address at a different point in time can be an attack on a completely different asset. While each asset has one or more unique identifiers (for example, a MAC address), this data is often not included in the alert data, and thus cannot be used to identify the asset.

In some implementations, this problem is solved when the alerts do contain the unique identifiers for the assets. However, as noted above, this data is rarely included in attack data. As an alternative, when the countermeasure source(s) 214 are unsure which asset to associate with a given sensor, the source(s) 214 can make a selection, for example, an arbitrary selection. After the selection is made, the countermeasure source(s) 214 can receive input from a user manually override the association. This input is received, for example, through a user interface.

In some implementations, the data associating sensors with assets can associate a sub-part of the sensor with the asset, when that sub-part protects the asset. For example, if a particular port on a network-based sensor, or a particular software program running on a sensor, protects an asset, the association can further specify the port or software program.

§2.1.5 Normalizing and Reconciling the Data

The data described above is received from different sources and is not necessarily in the same format. For example, each source can identify threats, countermeasures, and assets using different naming conventions. Therefore, the remediation prioritization system 102 may have to normalize the data before it can be used. The remediation prioritization system 102 normalizes the data by using source-specific reconcilers 216 that format the data received from a given source into a standard format. For example, an enterprise may receive data from two products, product A and product B. Product A may provide the data in one format, and product B may provide the data in a different format. The remediation prioritization system 102 uses a reconciler specific to product A to translate the data from Product A into a format that can be used by the remediation prioritization system 102. Similarly, the remediation prioritization system 102 uses a reconciler specific to product B to translate the data from product B into a format that can be used by the remediation prioritization system 102. Each source-specific reconciler can be, for example, one or more computers or one or more software programs on one or more computers. Each source-specific reconciler 216 translates the data, for example, using a corresponding table that maps identifiers used by the specific source to identifiers used by the remediation prioritization system 102.

§3.0 Example Process for Remediation Prioritization

Figure 3:
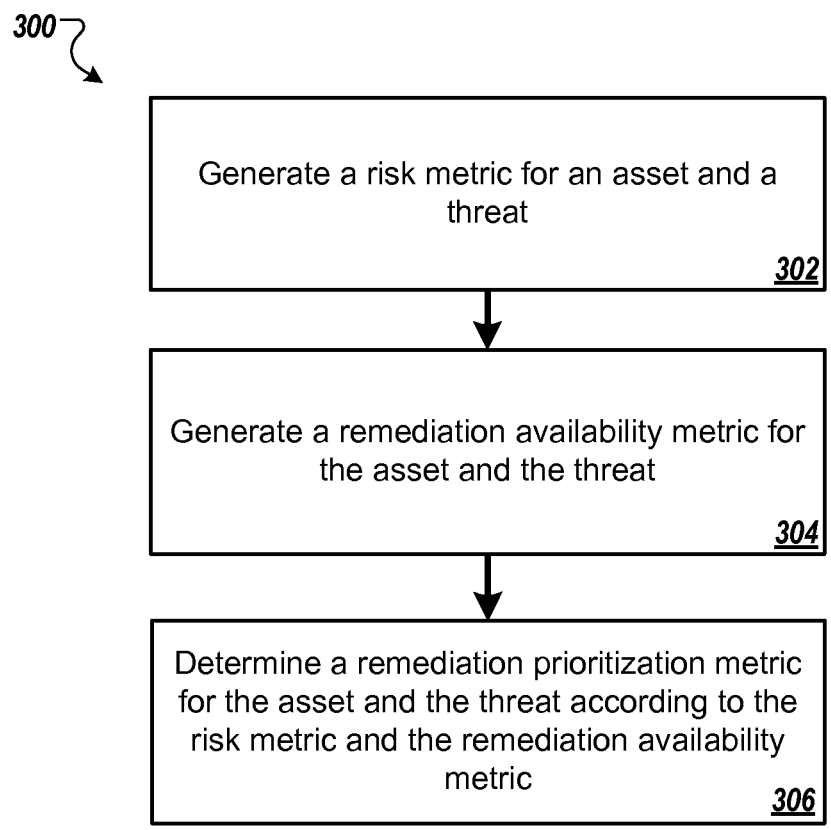
FIG. 3 is a flow diagram of an example process for generating a remediation prioritization metric for an asset and a threat.

FIG. 3 is a flow diagram of an example process 300 for generating a remediation prioritization metric for an asset and a threat. The process can be implemented, for example, by the remediation prioritization system 102.

The process 300 generates a risk metric for an asset and a threat (302). The risk metric is an estimate of a risk that the threat will affect the asset. In general, the risk metric is more than a mere binary determination of whether the asset is vulnerable to the threat. In some implementations, the risk metric specifies a risk categorization of the asset. In some implementations, the risk metric is a compound risk metric that specifies a risk categorization of the asset and a severity score estimating a severity of the threat. An example process for generating a risk metric for an asset and a threat is described in more detail below in §3.1.

The process 300 generates a remediation availability metric for the asset and the threat (304). The remediation availability metric is based, at least in part, on whether a remediation for the threat is available and not applied to the asset. Example remediations are described above with reference to FIG. 1.

In some implementations, the remediation availability metric has one value if the remediation is available and not applied to the asset, and another value if the remediation is not available or is already applied to the asset. Other metrics can alternatively or additionally be used. For example, if multiple patches are needed to provide full protection for the asset, the metric can be derived from how many of the multiple patches are available.

The process 300 determines a remediation prioritization metric for the asset and the threat according to the risk metric and the remediation availability metric. The remediation prioritization metric specifies a priority of applying the remediation to the asset.

In some implementations, the remediation prioritization metric is one of a pre-defined set of remediation prioritization categories, e.g., patch immediately, patch urgently, patch later, or patch not required. In these implementations, the process 300 can determine the appropriate category for the remediation prioritization metric according to a pre-defined set of rules.

For example, the process 300 can determine that the remediation prioritization metric should be "patch immediately" if the risk metric indicates that the asset is vulnerable to the threat with no countermeasure protection and also indicates that the severity of the threat is high, and if the remediation availability metric indicates that a remediation is available. The process 300 can determine that the remediation prioritization metric should be "patch urgently" if the risk metric indicates that the asset is vulnerable to the threat with no countermeasure protection and also indicates that the severity of the threat is not high, and if the remediation availability metric indicates that a remediation is available. The process 300 can determine that the remediation prioritization metric should be "patch later" if the risk metric indicates that the asset is vulnerable to the threat but there is at least some countermeasure protection for the asset, and if the remediation availability metric indicates that a remediation is available. The process 300 can determine that the remediation prioritization metric should be "patch not required" if the risk metric indicates that no remediation is available (or the remediation has already been applied to the asset), or if the risk metric indicates that the asset is not vulnerable to the threat.

In some implementations, the remediation prioritization metric is further determined according to a criticality of the asset. The criticality of an asset estimates an impact of losing an asset. In some implementations, the criticality of an asset is a monetary value of an asset, e.g., an estimate of the monetary cost of replacing the asset. Alternatively or additionally, the criticality of an asset can be derived from a business value of the asset, e.g., an importance of the asset to the overall asset system.

The process 300 can determine the criticality of an asset in various ways. In some implementations, users specify the criticality of individual assets, or groups of assets, for example, through a user interface. In some implementations, the assets in the system are represented in a hierarchical tree; in these implementations, a user can identify a group of assets by selecting a particular level in the hierarchy. All assets at the selected level or below the selected level in the hierarchy are considered a group. In some implementations, users assign tags to individual assets, and then specify criticality for particular tags. For example, a user could tag some assets as mail servers and some assets as web servers, and then specify that mail servers have one criticality and web servers have a different criticality.

In some implementations, the process 300 determines the criticality of an asset from user-defined rules that specify how criticality should be determined. For example, users can specify that assets that are running a particular operating system and that have an IP address in a certain range should have one criticality, while assets in a different IP range should have a different criticality. In some implementations, the process 300 imports the criticality of the assets from a separate asset management system.

In some implementations, an asset can have multiple criticalities depending on how it is grouped. For example, an asset that is a mail server in a particular office in California can be grouped into one group because it is a mail server, another group because it is in the particular office in California, and another group because it is in North America. An appropriate criticality can be selected given one or more rules maintained by the risk prioritization system 102 or another system executing the process.

Once the criticality of an asset is determined, the process 300 can use the criticality of the asset in various ways. In some implementations, the process 300 uses the criticality of the asset a further factor when selecting between the patch immediately and patch urgently remediation prioritization metrics. For example, assuming that the asset is vulnerable to the threat with no countermeasures and a remediation is available, the process can select the patch immediately remediation prioritization metric if the severity score of the threat satisfies (e.g., exceeds) a severity threshold and the asset has a criticality that satisfies (e.g., exceeds) a criticality threshold, and otherwise can select the patch urgently metric.

Other heuristics for generating the remediation prioritization metric can also be used. For example, various thresholds can be used to specify the severity of threats or the amount of countermeasure protection that is required before an asset and a threat will be labeled as patch immediately. Other thresholds, for example, on the risk score, the age of the patch, or how active the threat is can also be used to distinguish between the patch immediately and patch urgently categories.

In some implementations, the remediation prioritization system 102 allows a user to modify one or more of the criteria used by the process 300 to determine an appropriate remediation prioritization metric for an asset and a threat. For example, a user can specify the severity threshold or the criticality threshold used to select between the patch immediately and patch urgently remediation prioritization metrics.

As another example, in some implementations, users can specify one or more requirements for countermeasure protection. For example, a user can specify whether partial countermeasure protection is sufficient to be considered countermeasure protection, or can specify a minimum number of countermeasures that are required before an asset is considered protected by countermeasures. The countermeasure requirements can be used by the system 102 when the risk metric is determined.

As yet another example, in some implementations, a user can specify how the remediation prioritization metrics should change once one (or more) remediations for an asset and a threat have been applied to an asset. For example, if there are two remediations for a threat—one that affects the operating system of an asset and one that affects an application running on the asset, a user can specify whether the prioritization metric should change once a first remediation is applied. For example, a user can specify that the prioritization metric should be less urgent than it would otherwise be once the first remediation is applied to the asset, for example, by specifying that a patch immediately categorization should become a patch urgently categorization once a first remediation is applied to an asset.

In some implementations, the process 300 determines a remediation prioritization metric for each of a number of assets and each of a number of threats, for example, by repeating the steps described above for each asset and each threat.

In some implementations, the remediation prioritization system 102 presents the remediation prioritization metric for a user. Example presentation formats are described in more detail below in §4.0.

In some implementations, the remediation prioritization system 102 takes one or more actions according to the remediation prioritization metrics. For example, the remediation prioritization system 102 can notify a remediation management system that particular assets should automatically have patches or other remediations installed. As another example, the remediation prioritization system 102 can automatically download remediations for assets and for threats categorized as patch immediately or patch urgently. As yet another example, the remediation prioritization system 102 can notify sensors, e.g., network intrusion protection system or network access system, if assets have more than a threshold number of patch immediately or patch urgently threats, and instruct the sensors to deny network access to those assets. As yet another example, the remediation prioritization system 102 can initiate a quarantine of assets that require immediate patching, for example, by contacting an appropriate protection system. As still another example, the remediation prioritization system 102 can alert protection systems monitoring the asset system when assets have remediation prioritization metrics in particular ranges (e.g., patch immediately or patch urgently) so that the protection systems can take any necessary actions.

§3.1 Example Process for Determining a Risk Metric for an Asset and a Threat

Figure 4:
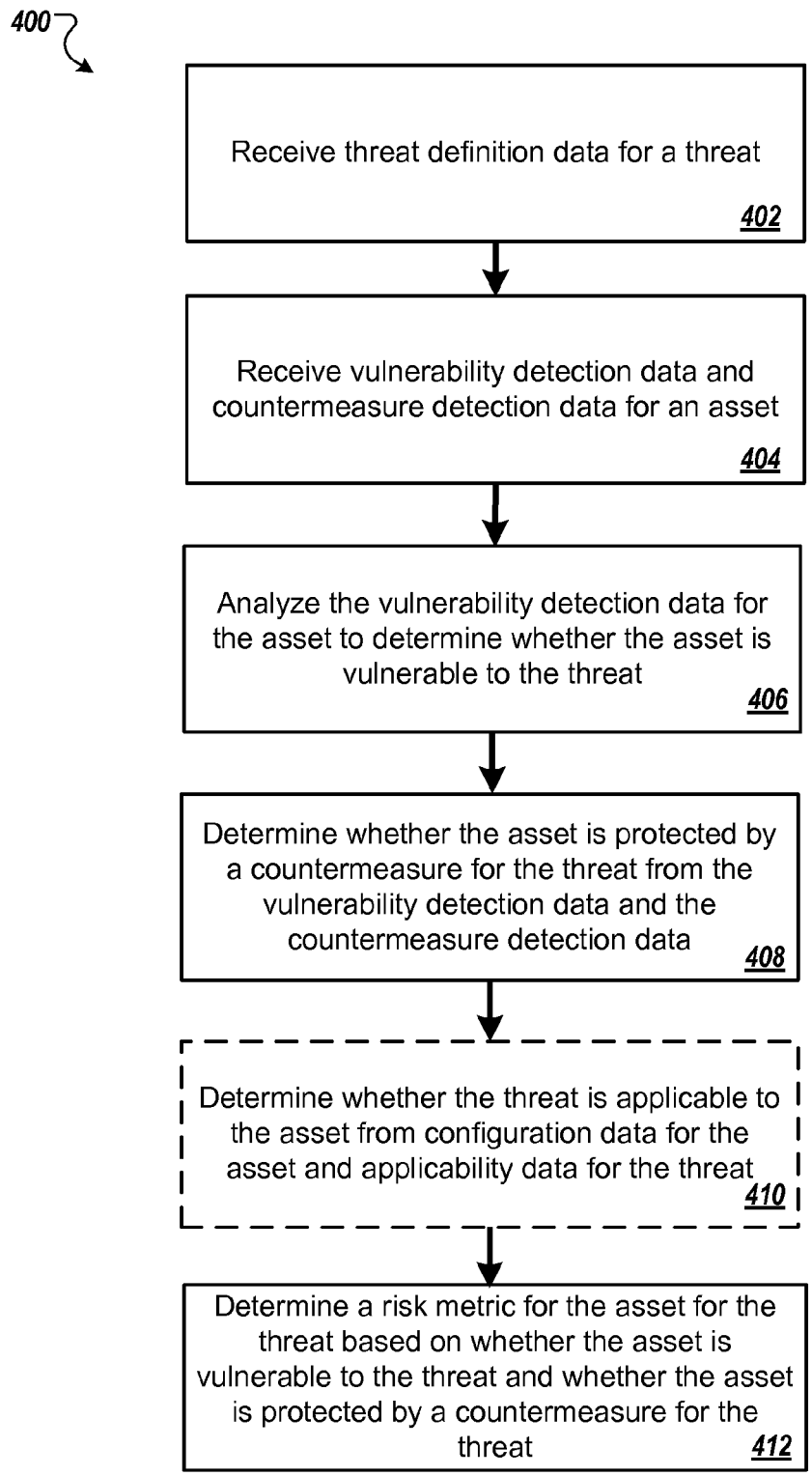
FIG. 4 is a flow diagram of an example process for determining a risk metric for an asset and a threat.

FIG. 4 is a flow diagram of an example process 400 for determining a risk metric for an asset and a threat. The process can be implemented, for example, by the remediation prioritization system 102.

The process 400 receives threat definition data for a threat (402), for example, as described above with reference to FIG. 2. The process receives vulnerability detection data and countermeasure detection data for an asset (404), for example, as described above with reference to FIG. 2.

The process 400 analyzes the vulnerability detection data for an asset to determine whether the asset is vulnerable to the threat (406). An asset is vulnerable to a threat when the asset is running software that has a known vulnerability that can be exploited by the threat, and the problem has not been patched or otherwise remediated. The process 400 determines whether the asset is vulnerable to a threat by analyzing the vulnerability detection data to determine whether any test whose outcome is included in the vulnerability detection data identified the asset as being vulnerable to the threat. If so, the process 400 determines that the asset has a predicate categorization of vulnerable to the threat. If not, the process 400 next analyzes the data to determine whether any test identified the asset as being not vulnerable to the threat. If so, the process 400 determines that the asset has a predicate categorization of not vulnerable to the threat. Finally, if no test whose outcome is included in the vulnerability detection data identified the asset as being vulnerable or not vulnerable to the threat, the process 400 determines that the asset has a predicate categorization of unknown for the threat.

The process 400 determines whether the asset is protected by a countermeasure for the threat from the vulnerability detection data and the countermeasure detection data (408). The process 400 determines whether an asset is protected by countermeasures for a threat by identifying the countermeasures for the threat specified in the threat definition data for the threat, and also identifying the countermeasures protecting the asset from the countermeasure detection data. The process 400 then determines whether any of the countermeasures for the threat are protecting the asset. If so, the process determines that the asset has a predicate classification of protected for the threat. Otherwise, the process 400 determines whether the data indicates that countermeasures for the threat are not protecting the asset. If the countermeasures are not protecting the asset, the process 400 determines that the asset has a predicate classification of not protected for the threat. Otherwise, the process determines that the asset has a predicate classification of unknown protection for the threat.

The process 400 optionally determines whether the threat is applicable to the asset from configuration data for the asset and applicability data for the threat (410). A threat is applicable to an asset when the asset is running software that is of a type that can have a vulnerability that is exploited by the threat. For example, if a particular operating system has a known vulnerability that is exploited by a threat, and an asset is running that operating system, the threat is applicable to the asset. This is true regardless of whether the operating system on the asset has the vulnerability, or has been remediated to remove the vulnerability.

The process 400 compares applicability data for a given threat to configuration data for a given asset to determine whether the given threat is applicable to the given asset. The applicability data and configuration data are described in more detail above, with reference to FIG. 2. The process 400 determines that the threat has a predicate classification of applicable to the asset when the applicability data matches the configuration data. The process 400 determines that the threat has a predicate classification of not applicable to the asset when the applicability data does not match the configuration data. The process 400 determines that the threat has a predicate classification of unknown when either configuration data or applicability data for the asset and the threat are not available.

In some implementations, the process 400 determines that a threat is applicable to an asset when the applicability data for the threat specifies a configuration that exactly matches the configuration of the asset. In other implementations, the process 400 determines that a threat is applicable to an asset when the configuration specified by the applicability data only partially matches the configuration of the asset. The configuration specified by the applicability data partially matches the configuration of the asset when some aspect of the configuration specified in the applicability data matches the configuration data for the asset, but some other aspect does not. For example, the process 400 can determine that the applicability data for a threat partially matches the configuration of an asset when the operating system targeted by the threat and the operating system running on the asset are in the same family, but not identical operating systems.

The process 400 determines a risk metric for the asset for the threat based on whether the asset is vulnerable to the threat and whether the asset is protected by a countermeasure for the threat (412). In some implementations, the process 400 determines the final risk metric from the predicate categorizations for the asset and the threat.

In some implementations, the process 400 further considers the predicate classification indicating whether the threat is applicable to the asset when generating the risk metric. In these implementations, the process 400 can select a final risk metric for a given asset and a given threat from the following risk categorizations: vulnerable, protected, not protected, unknown, and not vulnerable. In general, an asset is vulnerable if the asset was found to have a vulnerability to the threat and no countermeasures were detected that could mitigate the threat. An asset is protected when a countermeasure has been detected on the asset that can protect the asset from the threat. An asset is not protected when no countermeasures were detected that protect against the threat, and the asset was not found to have a vulnerability to the threat. An asset is unknown when neither a vulnerability to the threat nor any countermeasures have been detected.

The appropriate categorizations can be determined as follows. The final risk categorization of an asset for a threat is vulnerable when all of the following conditions are met: (1) the asset has a predicate categorization of vulnerable, (2) the asset has a predicate categorization of applicable or unknown applicability, and (3) the asset has a predicate classification of not protected. The final risk categorization is protected when all of the following conditions are met: (1) the asset has a predicate classification of protected for the threat, (2) the asset has a predicate categorization of vulnerable or unknown vulnerability to the threat, and (3) the asset has a predicate categorization of either applicable or unknown applicability for the threat. The final risk categorization is not protected when all of the following conditions are met: (1) the asset has a predicate categorization of not protected, (2) the asset has a predicate categorization of unknown vulnerability to the threat, and (3) the asset has a predicate categorization of either applicability for the threat or unknown applicability for the threat. The final risk categorization is unknown when all of the following conditions are met: (1) the asset has a predicate categorization of unknown protection from the threat, (2) the asset has a predicate categorization of unknown vulnerability, and (3) the asset has a predicate categorization of applicable or unknown applicability of the threat. Otherwise, the final risk categorization is not vulnerable.

Other final categorizations, and rules for determining them, can alternatively be used.

In some implementations, rather than selecting a discrete categorization for the asset for the threat, the process 400 can select a different metric. For example, in some implementations, the threat definition data includes a severity score estimating a severity of the threat or a countermeasure confidence score estimating a confidence that the countermeasures for the threat will be successful, and the system further bases the final categorization on the risk score and/or the countermeasure confidence score(s) for the countermeasure(s) protecting the asset. For example, the system can generate an at risk score for the asset, where the at risk score is derived from the analysis described above as well as the severity score and/or the countermeasure confidence score(s) for the countermeasure(s) protecting the asset. This at risk score can then be the risk metric for the threat.

In some implementations, the risk metric is a compound metric that includes both a categorization, as described above, and the severity score.

§4.0 Example Presentations of Remediation Prioritization Metrics

Once the remediation prioritization system 102 determines an appropriate remediation prioritization metric for one or more of the assets in the system and one or more threats to which the assets are vulnerable, the system 102 can present the determined remediation prioritization metrics to users (e.g., system administrators) in various ways.

§4.1 Example Threat-Centric Presentation of Remediation Prioritization Metrics

Figure 5A:
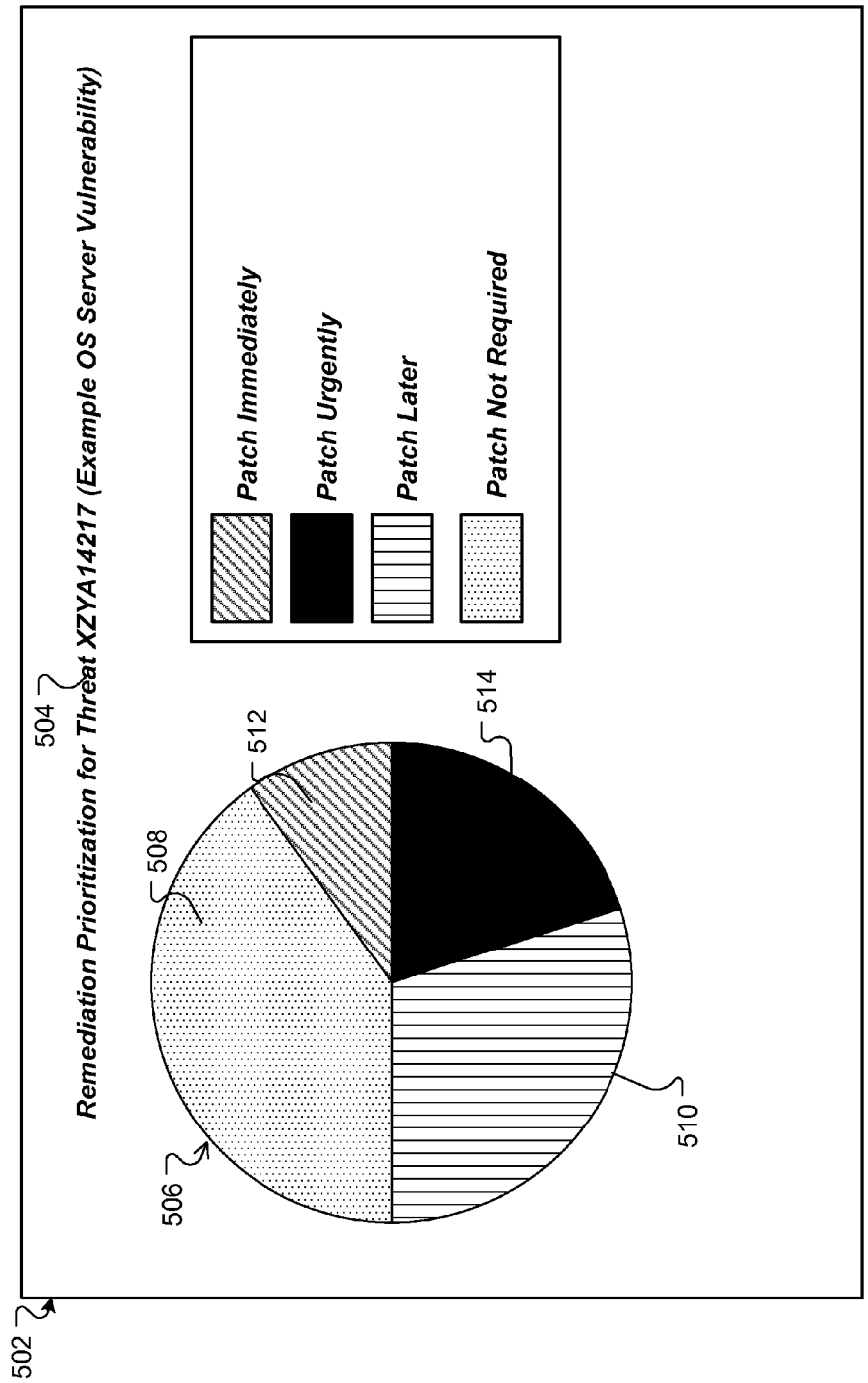
FIG. 5A illustrates an example presentation of a threat-centric summary of remediation prioritization metrics.

FIG. 5A illustrates an example presentation of a threat-centric summary 502 of remediation prioritization metrics. The summary 502 is threat-centric because it presents the remediation prioritization metrics for all assets in a system for a particular threat (Threat XZYA14217).

The summary 502 identifies the threat 504 and includes a chart 506 that shows the breakdown of remediation prioritization metrics for assets in the system for the threat. The size of each section of the chart (e.g., sections 508, 50, 512, and 514 of the chart) corresponds to the number of assets having a remediation prioritization metric represented by the section of the chart. In FIG. 5A, the breakdown of remediation prioritization metrics correspond to discrete categorizations of remediation prioritization metrics. However, other classifications corresponding to other remediation prioritization metrics can also be used. Also, other types of charts, in addition to the pie chart illustrated in FIG. 5A, can alternatively be used.

The chart 506 indicates that a large number of assets either do not require a remediation (e.g., section 508 of the chart) or can be remediated later (e.g., section 510 of the chart). However, a small number of assets need to be remediated immediately (e.g., section 512 of the chart), and a slightly larger number of assets need to be remediated urgently (section 514 of the chart).

A system administrator can use the chart 506 to quickly focus efforts to protect the system. For example, a system administrator might start by remediating the patch immediately 512 assets, followed by the patch urgently 514 assets. The system administrator might also note that the patch later 510 assets will eventually need to be remediated so that they are not vulnerable to the threat; however, this remediation can wait until the more urgent assets are remediated.

In some implementations, the remediation prioritization summary is presented in a user interface, for example, on a computer. In these implementations, the system administrator can identify which assets are in each categorization by selecting the categorization of interest (e.g., by clicking on one of the pieces in the chart). This action will present the system administrator with a list of all assets that fall into the particular categorization. The system administrator can then select a particular asset in the list to view a more detailed report for that asset.

FIG. 5B illustrates an example detailed listing 550 of assets that have a remediation prioritization metric of patch immediately for the threat XZYA14217. The listing 550 allows a user to quickly identify which assets need to be remediated immediately. If a user selects (e.g., by clicking on) one of the assets, the user can be presented with a page detailing the analysis performed for the asset and the threat, for example, how the vulnerability was detected and what countermeasures were checked for by the remediation prioritization system 102.

§4.2 Example Asset-Centric Presentation of Remediation Prioritization Metrics

Figure 6A:
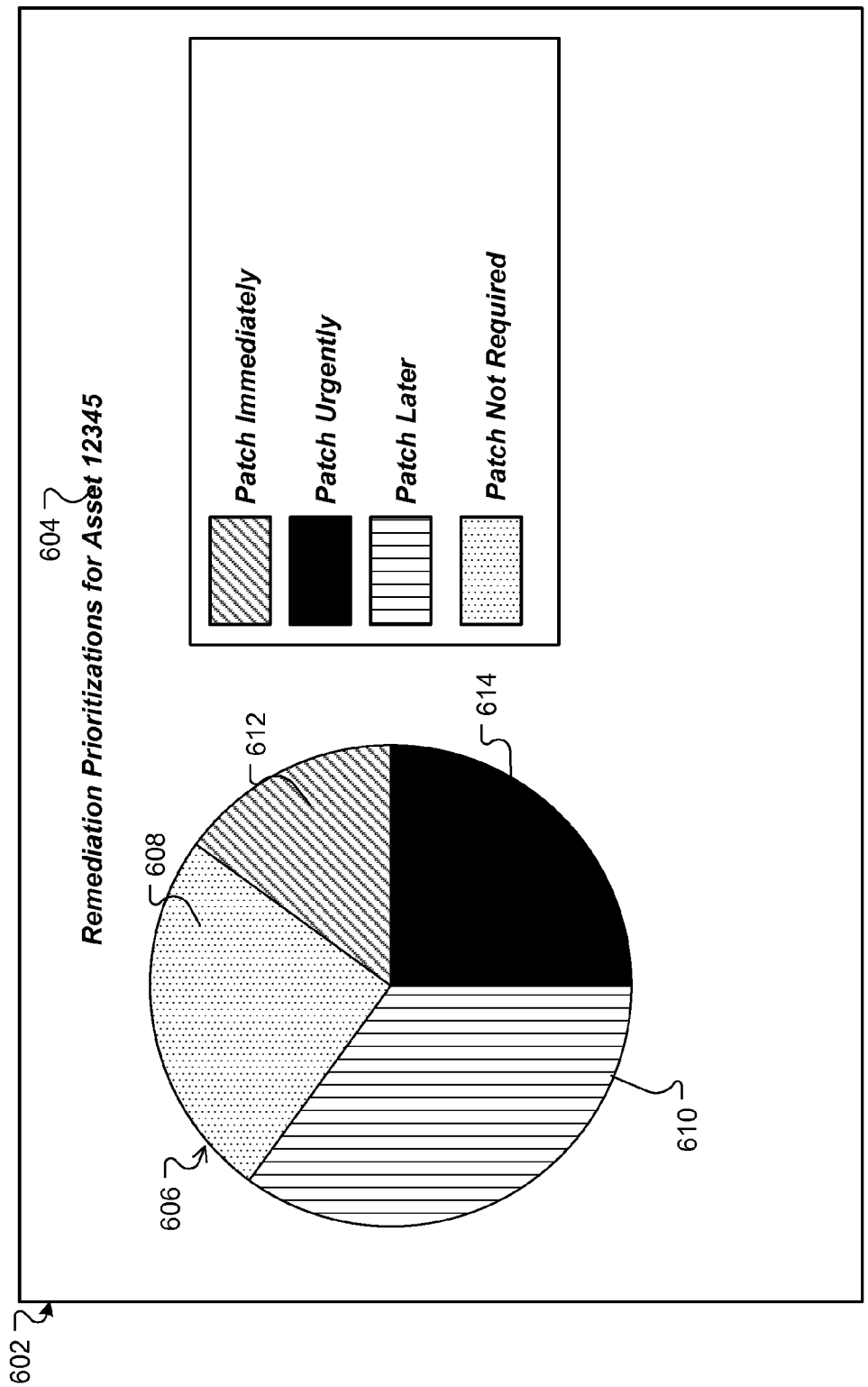
FIG. 6A illustrates an example presentation of an asset-centric summary of remediation prioritization metrics.

FIG. 6A illustrates an example presentation of an asset-centric summary 602 of remediation prioritization metrics. The summary 602 is asset-centric because it presents the remediation prioritization metrics for all known threats for a particular asset (Asset 12345).

The summary 602 identifies the asset 604 and includes a chart 606 that shows the breakdown of remediation prioritization metrics for the asset for various threats. The size of each section of the chart (e.g., sections 608, 610, 612, and 614 of the chart) corresponds to the number of threats for which the asset has a remediation prioritization metric represented by the section of the chart. In FIG. 6A, the breakdown of remediation prioritization metrics correspond to discrete categorizations of remediation prioritization metrics. However, other classifications corresponding to other remediation prioritization metrics can also be used.

The chart 606 indicates that for a large number of threats, a remediation is not required (e.g., section 608 of the chart), or can be applied later (e.g., section 610 of the chart). However, for some threats, the asset should either be remediated immediately (e.g., section 612 of the chart) or remediated urgently (e.g., section 614 of the chart).

A system administrator can use the chart 606 to quickly focus efforts to protect the asset. For example, a system administrator might start by remediating the patch immediately 612 threats, followed by the patch urgently 614 threats. The system administrator can also determine that the patch later 610 and patch not required 608 threats can wait to be remediated at a later time.

In some implementations, the remediation prioritization summary is presented in a user interface, for example, on a computer. In these implementations, the system administrator can identify which threats are in each categorization by selecting the categorization of interest (e.g., by clicking on one of the pieces in the chart). This action will present the system administrator with a list of all threats for which the asset has the particular remediation prioritization metric corresponding to the selected categorization. The system administrator can then select a particular threat in the list to view a more detailed report for that threat.

FIG. 6B illustrates an example detailed listing 650 of threats for which the asset 12345 has a remediation prioritization metric of patch immediately. If a user selects (e.g., by clicking on) one of the assets, the user can be presented with a page detailing the analysis done for the asset and the threat, for example, as described above with reference to FIG. 5B.

§4.3 Additional Example Presentations of Remediation Prioritization Metrics

Sections 4.1 and 4.2 describe two example presentations of remediation prioritization metrics. However, other presentations can also be used.

For example, in some implementations, the presentation of the summary of the remediation prioritization metrics is a two-tiered presentation. The first tier divides assets (or threats, depending on whether the presentation is threat-centric or asset-centric, respectively) into patch and do not patch categorizations. If a user selects on the section of the presentation corresponding to assets (or threats) that need to be patched, the user is presented with a finer-grained categorizations, for example, the patch immediately, patch urgently, and patch later categorizations described above.

In some implementations, the presentation is a heat map overlaid over a representation of the system of assets. The heat at any given point in the representation is derived from the categorizations of assets at that point in the representation. For example, the heat can be derived from the number of threats for which each asset has a remediation prioritization metric of patch immediately or patch urgently.

The representation of system assets can be, for example, the hierarchical tree structure itself, groups of similarly tagged assets, a network topology map, an office layout plan, or a map of offices nationwide or worldwide. The heat at a given point in the representation can be indicated, for example, a color, an icon, or another representation corresponding to the various risk prioritization metrics. For example, in some implementations, the heat map is shown on a hierarchical tree representation of the assets in the system. Colors at each level of the tree representation indicate the categorization of the assets at that level and below that level in the tree.

In some implementations, the presentation is a threat timeline presentation that illustrates how long the threat has been known, how long the remediation has been available, and how assets have had particular classifications. For example, if a threat was discovered at day zero, a patch was available at day five, an asset was categorized as patch urgently at day ten, remediations were applied to the asset and the asset was downgraded to patch later at day fifteen, the timeline could indicate each of those points in time. In some implementations, the timeline aggregates data for multiple assets, for example, to give system administrators an overview of how long it takes to fix known threats to the system.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, comprising:

using at least one processor device to generate a risk metric for an asset and a threat, wherein the risk metric is an estimate of a risk that the threat will affect the asset;

generating a remediation availability metric for the asset and the threat, wherein the remediation availability metric is based, at least in part, on whether a remediation for the threat is available and not applied to the asset, wherein the remediation reduces the risk that the threat will affect the asset when applied to the asset; and determining a remediation prioritization metric for the asset and the threat according to the risk metric and the remediation availability metric, wherein the remediation prioritization metric specifies a priority of applying the remediation to the asset;

wherein generating the risk metric for the asset and the threat comprises:

receiving threat definition data for the threat and vulnerability detection data and countermeasure detection data for the asset, wherein the threat definition data identifies one or more countermeasures that reduce a risk that the threat will affect an asset, the vulnerability detection data identifies threats to which the asset is vulnerable, and the countermeasure detection data identifies one or more countermeasures protecting the asset;

analyzing the vulnerability detection data to determine whether the asset is vulnerable to the threat;

determining from the threat definition data and the countermeasure detection data whether the asset is protected by one of the countermeasures identified for the threat; and determining the risk metric for the asset for the threat according to whether the asset is vulnerable to the threat and whether the asset is protected by one of the countermeasures identified for the threat.

2. The method of claim 1, further comprising presenting the remediation prioritization metric to a user.

3. The method of claim 1, wherein the remediation is an active countermeasure that modifies a configuration of the asset.

4. The method of claim 1, wherein the remediation is a software patch.

5. The method of claim 1, wherein determining the risk metric further comprises determining whether the threat applies to a configuration of the asset.

6. The method of claim 1, wherein the risk metric for the asset and the threat is a compound risk metric further comprising a severity score estimating a severity of the threat.

7. The method of claim 6, wherein:

the remediation prioritization metric is patch immediately if the risk metric indicates that the asset is vulnerable to the threat with no countermeasure protection, the severity score satisfies a severity threshold, and the remediation availability metric indicates that a remediation is available;

the remediation prioritization metric is patch urgently if the risk metric indicates that the asset is vulnerable to the threat with no countermeasure protection, the severity score does not satisfy the severity threshold, and the remediation availability metric indicates that a remediation is available;

the remediation prioritization metric is patch later if the risk metric indicates that there is at least some countermeasure protection for the asset, and if the remediation availability metric indicates that a remediation is available; and otherwise, the remediation prioritization metric is do not patch.

8. The method of claim 1, wherein the remediation prioritization metric for the asset and the threat is further based on a criticality of the asset.

9. The method of claim 8, wherein the criticality of an asset is derived from a monetary value of the asset.

10. The method of claim 8, wherein the criticality of an asset is derived from a business value of the asset.

11. The method of claim 1, further comprising determining a respective remediation prioritization metric for each of a plurality of assets and each of a plurality of threats.

12. A system comprising:
a processor; and
a computer storage medium coupled to the processor and including instructions, which, when executed by the processor, causes the processor to perform operations comprising:
   generating a risk metric for an asset and a threat, wherein the risk metric is an estimate of a risk that the threat will affect the asset;
   generating a remediation availability metric for the asset and the threat, wherein the remediation availability metric is based, at least in part, on whether a remediation for the threat is available and not applied to the asset, wherein the remediation reduces the risk that the threat will affect the asset when applied to the asset; and
   determining a remediation prioritization metric for the asset and the threat according to the risk metric and the remediation availability metric, wherein the remediation prioritization metric specifies a priority of applying the remediation to the asset;
wherein generating the risk metric for the asset and the threat comprises:
   receiving threat definition data for the threat and vulnerability detection data and countermeasure detection data for the asset, wherein the threat definition data identifies one or more countermeasures that reduce a risk that the threat will affect an asset, the vulnerability detection data identifies threats to which the asset is vulnerable, and the countermeasure detection data identifies one or more countermeasures protecting the asset;
   analyzing the vulnerability detection data to determine whether the asset is vulnerable to the threat;
   determining from the threat definition data and the countermeasure detection data whether the asset is protected by one of the countermeasures identified for the threat; and
   determining the risk metric for the asset for the threat according to whether the asset is vulnerable to the threat and whether the asset is protected by one of the countermeasures identified for the threat.

13. The system of claim 12, wherein the operations further comprise presenting the remediation prioritization metric to a user.

14. The system of claim 12, wherein the risk metric for the asset and the threat is a compound risk metric further comprising a severity score estimating a severity of the threat.

15. The system of claim 14, wherein:
the remediation prioritization metric is patch immediately if the risk metric indicates that the asset is vulnerable to the threat with no countermeasure protection, the severity score satisfies a severity threshold, and the remediation availability metric indicates that a remediation is available;
the remediation prioritization metric is patch urgently if the risk metric indicates that the asset is vulnerable to the threat with no countermeasure protection, the severity score does not satisfy the severity threshold, and the remediation availability metric indicates that a remediation is available;
the remediation prioritization metric is patch later if the risk metric indicates that there is at least some countermeasure protection for the asset, and if the remediation availability metric indicates that a remediation is available; and
otherwise, the remediation prioritization metric is do not patch.

16. The system of claim 12, wherein the remediation prioritization metric for the asset and the threat is further based on a criticality of the asset.

17. The system of claim 12, wherein the operations further comprise determining a respective remediation prioritization metric for each of a plurality of assets and each of a plurality of threats.

18. A non-transitory computer-storage medium encoded with a computer program including instructions operable to cause data processing apparatus to perform operations comprising:
   generating a risk metric for an asset and a threat, wherein the risk metric is an estimate of a risk that the threat will affect the asset;
   generating a remediation availability metric for the asset and the threat, wherein the remediation availability metric is based, at least in part, on whether a remediation for the threat is available and not applied to the asset, wherein the remediation reduces the risk that the threat will affect the asset when applied to the asset; and
   determining a remediation prioritization metric for the asset and the threat according to the risk metric and the remediation availability metric, wherein the remediation prioritization metric specifies a priority of applying the remediation to the asset;
wherein generating the risk metric for the asset and the threat comprises:
   receiving threat definition data for the threat and vulnerability detection data and countermeasure detection data for the asset, wherein the threat definition data identifies one or more countermeasures that reduce a risk that the threat will affect an asset, the vulnerability detection data identifies threats to which the asset is vulnerable, and the countermeasure detection data identifies one or more countermeasures protecting the asset;
   analyzing the vulnerability detection data to determine whether the asset is vulnerable to the threat;
   determining from the threat definition data and the countermeasure detection data whether the asset is protected by one of the countermeasures identified for the threat; and
   determining the risk metric for the asset for the threat according to whether the asset is vulnerable to the threat and whether the asset is protected by one of the countermeasures identified for the threat.

19. The non-transitory computer-storage medium of claim 18, wherein the operations further comprise presenting the remediation prioritization metric to a user.

20. The non-transitory computer-storage medium of claim 18, wherein the risk metric for the asset and the threat is a compound risk metric further comprising a severity score estimating a severity of the threat.

21. The non-transitory computer-storage medium of claim 20, wherein:
the remediation prioritization metric is patch immediately if the risk metric indicates that the asset is vulnerable to the threat with no countermeasure protection, the severity score satisfies a severity threshold, and the remediation availability metric indicates that a remediation is available;
the remediation prioritization metric is patch urgently if the risk metric indicates that the asset is vulnerable to the threat with no countermeasure protection, the severity score does not satisfy the severity threshold, and the remediation availability metric indicates that a remediation is available;

the remediation prioritization metric is patch later if the risk metric indicates that there is at least some countermeasure protection for the asset, and if the remediation availability metric indicates that a remediation is available; and otherwise, the remediation prioritization metric is do not patch.

22. The non-transitory computer-storage medium of claim 18, wherein the remediation prioritization metric for the asset and the threat is further based on a criticality of the asset.

23. The non-transitory computer-storage medium of claim 18, wherein the operations further comprise determining a respective remediation prioritization metric for each of a plurality of assets and each of a plurality of threats.

* * * * *